Patented Dec. 30, 1941

2,268,157

UNITED STATES PATENT OFFICE 2,268,157

GAMMA OXOPHOSPHONIC ACIDS AND DERIVATIVES THEREOF

Carl S. Marvel, Urbana, Ill.

No Drawing. Application May 5, 1939,
Serial No. 272,013

12 Claims. (Cl. 260—500)

This invention relates to new organic derivatives of phosphorus and more particularly to aliphatic γ-oxophosphonic acids of at least eight carbon atoms.

This invention has as an object the provision of a process for preparing aliphatic γ-oxophosphonic acids of at least eight carbon atoms. A further object of the invention is the class of new and useful acids thus prepared. Another object is the preparation of materials useful as surface active or capillary active materials useful in wetting, frothing, detergent, dispersing, emulsifying, and foaming compositions, ore flotation and the like. Other objects will appear hereinafter.

These objects are accomplished by the following invention wherein phosphorus tribromide or trichloride is reacted with an aliphatic alpha, beta-unsaturated aldehyde or ketone of at least eight carbon atoms to produce an aliphatic gamma-oxophosphonic acid, a bromide, chloride, anhydride or salt thereof as more fully detailed below.

While the invention is not to be restricted by theoretical considerations, the probable mechanism of the reaction between aliphatic alpha, beta-unsaturated ketones or aldehydes and phosphorus trichloride is the formation of an intermediate cyclic acid chloride which is hydrolyzed to a γ-oxophosphonic acid. The proposed mechanism of the reaction may be illustrated with 5-ethylnonen-3-one-2 as follows:

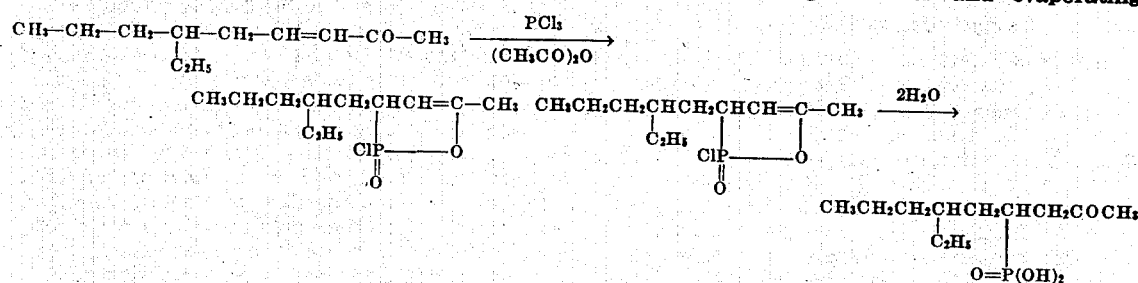

The phosphorous halide is reacted with the carbonyl compound, preferably at room temperature and preferably in the presence of a low molecular weight aliphatic monocarboxylic acid or acid anhydride, such as acetic acid or anhydride. The acid is isolated from the reaction mixture by hydrolysis, extraction with a suitable organic solvent from which it may in turn be extracted with alkali solution to free it from impurities.

The more detailed practice of the invention is illustrated by the following examples, wherein parts given are by weight. There are of course many forms of the invention other than these specific embodiments.

EXAMPLE I

5-ethylheptan-2-one-4-phosphonic acid

A mixture of 4 parts of 5-ethylhepten-3-one-2, 4 parts of phosphorus trichloride and 3 parts of acetic anhydride is held at 35° C. for three hours. The volatile material is then removed by evaporation at 70° C. under 18 mm. pressure. The residual viscous mass is dissolved in ether and small amounts of water are added. The ether solution is then extracted with 10% sodium hydroxide solution; the alkaline solution is separated and acidified with 10% sulfuric acid. The free phosphonic acid is taken up in ether, and the ether solution dried over anhydrous magnesium sulfate and treated twice with decolorizing carbon. On evaporation of the ether and drying over sulfuric acid in vacuo, 4 parts of a brown viscous material is obtained. The product, 5-ethylheptan-2-one-4-phosphonic acid, is soluble in alkali to give solutions which foam readily. Anal. calc'd for $C_9H_{19}O_4P$: P, 13.95. Found: P, 13.5, 13.3.

EXAMPLE II

3-ethylundecan-6-one-4-phosphonic acid

Ten parts of 3-ethylundecen-4-one-6, 7.5 parts of phosphorus trichloride and 5.6 parts of acetic anhydride react under the conditions described in Example I to yield a thick yellow oil. This oil on redissolving in ether and evaporating slowly, first in air, then in vacuo, yields 5 parts of 3-ethylundecan-6-one-4-phosphonic acid as a spongy yellow mass melting at 60–65° C. Anal. calc'd for $C_{13}H_{27}O_4P$: P, 11.15. Found: P, 11.3, 11.48.

EXAMPLE III

Anhydride of 3-ethyldodecan-6-one-4-phosphonic acid

Ten parts of 3-ethyldodecen-4-one-6, 6.8 parts of phosphorus trichloride and 5 parts of acetic anhydride react under the conditions described in Example I to yield 10 parts of the thick oily anhydride of 3-ethyldodecan-6-one-4-phosphonic acid. Anal. calc'd for $C_{28}H_{52}O_5P_2$: P, 11.70.

Found: P, 11.70, 11.63. The product is presumed to have the following structure:

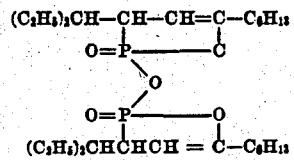

EXAMPLE IV

3,9-diethyltridecan-6-one-8-phosphonic acid

Twelve and six-tenths parts of 3,9-diethyltridecen-7-one-6 is reacted with 8.3 parts of phosphorus trichloride and 9 parts of glacial acetic acid at 30° C. in a glass reaction vessel closed with a calcium chloride drying tube. After standing for 4 days, the volatile contents are removed under vacuum, first at room temperature and then at 100° C. The residue is placed in a large volume of water and the resulting solution allowed to evaporate to dryness upon a steam bath. The residue is extracted with boiling ligroin solution washed with water until the water washings are neutral. The ligroin solvent is then evaporated and the residue dissolved in alcohol and decolorized with animal charcoal. The sodium salt of the phosphoric acid thus prepared is obtained by first diluting the alcohol solution with water and then neutralizing with sodium hydroxide using Phenol Violet indicator. A water solution of the disodium 3,9-diethyltridecan-6-one-8-phosphonate is a good wetting agent for textiles when tested by the method of Draves and Clarkson, American Dyestuff Reporter, 20, 201 (1931).

EXAMPLE V

5-ethylnonan-2-one-4-phosphonic acid

A mixture of 10 parts of 5-ethylnonen-3-one-2, 8.5 parts of phosphorus trichloride and 6.2 parts of acetic anhydride is processed as described in Example I. The 5-ethylnonan-2-one-4-phosphonic acid is obtained as a crystalline solid which melts at 66–69° C. Anal. calc'd for $C_{11}H_{23}O_4P$; P, 12.4. Found: P, 11.26, 11.26.

EXAMPLE VI

Disodium 9-ethyltridecan-6-one-8-phosphonate

A mixture of 5 parts of 9-ethyltridecen-7-one-6, 3.42 parts of phosphorus trichloride, 2.5 parts of acetic anhydride and a few parts of water is processed as described in Example I. About 0.5 part of 9-ethyltridecan-6-one-8-phosphonic acid is obtained as a brown oil. The oily acid is exactly neutralized with a standard sodium hydroxide solution, and this alkaline solution is mixed with benzene and distilled to remove all of the water. After removal of water and benzene, the residue is washed with acetone and dried in vacuo over sulfuric acid. The product is disodium 9-ethyltridecan-6-one-8-phosphonate. Anal. calc'd for $C_{15}H_{29}Na_2O_4P$; P, 8.85. Found: P, 8.5.

EXAMPLE VII

Anhydride of 3,9-diethylundec-4-en-6-one-8-phosphonic acid

Ten parts of 3,9-diethylundecadien-4,7-one-6, 7 parts of phosphorus trichloride and 5 parts of acetic anhydride react under the conditions described in Example I to yield a thick yellow oil which on drying changes to a very hygroscopic yellow solid. Analysis indicates that the product is an anhydride of the phosphonic acid of the probable structure:

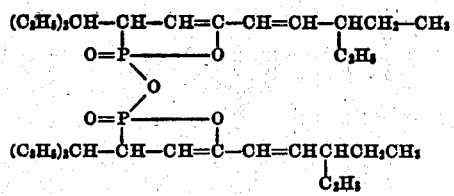

Anal. calc'd. for $C_{30}H_{52}O_5P_2$: P, 11.20. Found: P, 11.10, 11.7.

In the process of the invention, any phosphorous halide of halogen of atomic weight between 35 and 80, i. e., $PCl_3$ and $PBr_3$ may be reacted with any aliphatic alpha,beta-unsaturated aldehyde or ketone having at least eight carbon atoms. Ketones are preferred to aldehydes because of their greater stability. In addition to the reactants disclosed in the examples, there may be employed the following:

Octatrien-2,4,6-al-1, nonen-2-al-1, 2-ethylhexen-2-al-1, octen-2-al-1, 10-ethyltetracen-8-one-7, 5,11 - diethylpentadecadien - 6,9 - one - 8, 2 - methylhexadecen - 3 - one - 5, pentadecen-7-one-9, 5-ethyltetracen-6-one-8, 7-methylpentadecen-7-one-9, 2-methylheptadecen - 5 - one - 4, 2-methyldodecen - 5 - one-4, 2,8,12-trimethyltridecatrien-5,7,11-one-4, 2-methyl-8-ethyldodecen-3-one-5, 5-ethylhexadecen-9-one-8, 3-ethyltetradecen-7-one-6, 3,9 - diethyltridecen - 4 - one - 6, 9-ethyltridecan-4-one-6, 9-ethyltridecadien-4,7-one-6, 6-propyl-8-ethyldodecen-6-one-5, 9-ethyl-5-methyltridecadien-4,7-one-6,9-ethyl-5-methyltridecen-7-one-6, etc.

Although it is preferred to carry out the reaction between the aliphatic alpha, beta-unsaturated carbonyl compound with phosphorus trichloride in the presence of acetic acid or anhydride, any low molecular weight carboxylic acid or anhydride which does not react directly with phosphorus trichloride under the conditions of the reaction may be employed. Glacial acetic acid is the preferred medium when the ultimate product is to be the free phosphonic acid, while acetic anhydride is preferred when the intermediate phosphonyl chloride or the anhydride of the phosphonic acid is desired. The acid or anhydride employed as the medium in which reaction of phosphorus trichloride and the alpha, beta-unsaturated ketone or aldehyde occurs, functions not only as a solvent, but is chemically involved in the reaction which takes place, probably by reacting with a loose complex formed between the phosphorus trichloride and the carbonyl compound, and in this manner effecting higher yields of the final product. However, the presence of such an acid or anhydride is not essential, since low yields of γ-oxophosphonic acid may be obtained merely by combining phosphorus trichloride with an aliphatic alpha,beta-unsaturated carbonyl compound and hydrolyzing the mixture with water.

Wide variations may be used in the relative proportions of reactants employed in the synthesis of γ-oxophosphonic acids according to this invention. Depending upon considerations of cost and availability, molecular equivalent quantities of carbonyl compound and phosphorus trichloride may be used, or excess proportions of either reactant with substantially the same results. It is preferred, however, to use molecularly equivalent quantities of the carbonyl compound and acetic anhydride together with a slight excess of phosphorus trichloride. When acetic acid is employed, at least two molecular quantities are desirable. The reaction temperature may vary widely over a considerable range, the upper limit of which is chiefly determined by the temperature at which the acid or anhydride medium employed, begins to react with the phosphorus trichloride directly. The preferred temperature for optimum results with acetic anhydride is the range of 20-50° C. Higher temperatures are sometimes effective in bringing about reaction with relatively inert ketones or aldehydes, but at the same time frequently result in darkening and slight resinification of the reaction mixture. In the case of certain very reactive carbonyl compounds such as 5-ethylhepten-3-one-2, the reaction has been observed to be substantially complete within several hours at room temperature as judged by the high yield of phosphonic acid obtained on hydrolyzing the reaction mixture with water. However, longer reaction periods up to several days have also been used.

In many cases, it may not be necessary to obtain the products of this invention in their pure state. In this case, the procedure to be followed consists merely in the water hydrolysis of the crude reaction mixture followed if desired by neutralization of its acidity with an alkaline agent. However, if pure products are desired, it is preferable first to remove the volatile reaction constituents, such as acetic anhydride, acetyl chloride, unchanged phosphorus trichloride, and carbonyl compound, by mild heating of the reaction mixture in vacuo. Subsequent to water hydrolysis, the γ-oxophosphonic acid may be isolated and purified according to procedures well known to those familiar with the art.

The phosphonic acids described herein may be used as such, but generally they are converted to their alkali metal salts by neutralization with an alkali metal hydroxide such as sodium hydroxide. The potassium, ammonium, calcium and magnesium salts may also be prepared and used. Salts of metals and bases in general may be prepared. Heavy metal salts of the acids of this invention may be prepared by precipitation from solutions of suitable heavy metal salts by means of alkali metal salts of the acids of this invention. Suitable salts of the phosphonic acids described herein may also be made from such amines as dimethylamine, ethylamine, diethanolamine, triethanolamine, butylamine, glucamine, methylglucamine, pyridine, piperidine, cyclohexylamine, aniline, toluidine, ethylenediamine, hexamethylenediamine, etc.

This invention comprises, therefore, not only the aliphatic γ-oxophosphonic acids of at least eight carbon atoms, but also their anhydrides and their salts. The intermediate acid halides are also included.

The new compositions covered in this specification belong to the class of surface-active or capillary-active materials in that they have colloidal properties and may, therefore, be used advantageously in any process involving wetting, penetration, detergency, dispersion, emulsification, frothing, foaming, ore flotation, and kindred phenomena. These compositions may be employed in pure or standardized form and, if desired, in conjunction with known processing or treating agents. They may be used by themselves or in combination with other surface-active agents in any relation in which surface-active agents having colloidal properties have heretofore been used. Since the high molecular weight products of this invention have surface tension lowering properties, they may be utilized in many of the technical applications of surface-active compounds.

A further use of certain members of this new class of organic phosphorus derivatives consists in their varied and beneficial action as lubricant addition agents and modifying agents for motor fuel, for example, as metal deactivators and the like. The effective action of phosphonic acids as metal deactivators in gasoline is disclosed in copending application, Serial No. 302,856, filed Nov. 4, 1939.

The aliphatic γ-oxophosphonic acids and salts containing at least 8 carbon atoms as described in this specification possess properties not found in lower members of the series. For example, aqueous solutions of the alkali metal salts of these higher molecular weight acids show penetrating, deterging, foaming, and wetting action, whereas the analogous lower molecular weight members of this series lack these useful properties. Furthermore, salts of the aliphatic γ-oxophosphonic acids of this invention are effective dry-cleaning soaps, while the free acids possess properties which cause them to be useful as lubricant addition agents, in contrast to low molecular weight members of this series which do not display these valuable properties apparently because of inadequate solubility.

The above description and examples are intended to be illustrative only. Any modification of or variation therefrom which conforms to the spirit of the invention is intended to be included within the scope of the claims.

I claim:

1. A member of the class consisting of aliphatic gamma-oxophosphonic acids of at least eight carbon atoms, and salts and anhydrides thereof.

2. An aliphatic gamma-oxophosphonic acid having at least eight carbon atoms.

3. A salt of a compound of claim 2.

4. An alkali metal salt of a compound of claim 2.

5. An aliphatic gamma-ketophosphonic acid having at least eight carbon atoms.

6. Process which comprises reacting a member of the class consisting of phosphorus tribromide and trichloride with a member of the class consisting of alpha-beta-unsaturated aldehydes and ketones of at least eight carbon atoms.

7. Process which comprises reacting a member of the class consisting of phosphorus tribromide and trichloride with a member of the class consisting of alpha-beta-unsaturated aldehydes and ketones of at least eight carbon atoms in the presence of a member of the class consisting of low molecular weight aliphatic monocarboxylic acids and anhydrides thereof.

8. Process which comprises reacting phosphorus trichloride with an alpha-beta-unsaturated ketone of at least eight carbon atoms.

9. Process which comprises reacting phosphorus trichloride with an alpha-beta-unsaturated ketone of at least eight carbon atoms in the presence of acetic anhydride.

10. 5-ethylheptan-2-one-4-phosphonic acid.

11. The anhydride of 3-ethyldodecan-6-one-4-phosphonic acid.

12. The sodium salt of 3,9-diethyltridecane-6-one-8-phosphonic acid.

CARL S. MARVEL.